W. E. McDONELL.
TEMPLE FOR SPECTACLES AND METHOD OF MAKING SAME.
APPLICATION FILED DEC. 7, 1914.
1,225,343.
Patented May 8, 1917.
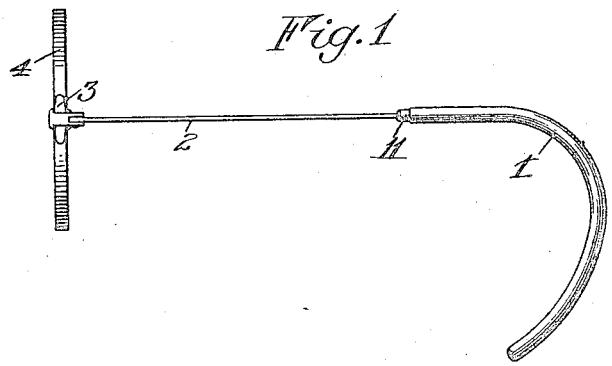
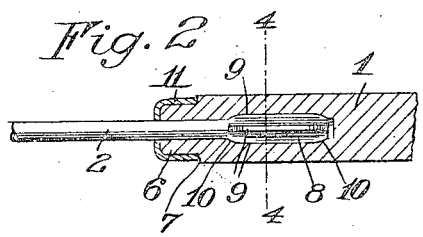
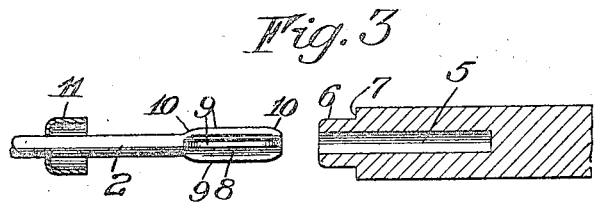 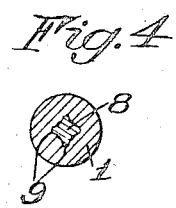
WITNESSES:
INVENTOR
William E. McDonell
BY
his ATTORNEYS

UNITED STATES PATENT OFFICE.

WILLIAM E. McDONELL, OF ROCHESTER, NEW YORK, ASSIGNOR TO E. KIRSTEIN SONS COMPANY, OF ROCHESTER, NEW YORK, A CORPORATION OF NEW YORK.

TEMPLE FOR SPECTACLES AND METHOD OF MAKING SAME.

1,225,343. Specification of Letters Patent. Patented May 8, 1917.

Application filed December 7, 1914. Serial No. 875,774.

*To all whom it may concern:*

Be it known that I, WILLIAM E. MCDONELL, of Rochester, in the county of Monroe and State of New York, have invented certain new and useful Improvements in Temples for Spectacles and Methods of Making Same; and I do hereby declare the following to be a full, clear, and exact description of the same, reference being had to the accompanying drawings, forming a part of this specification, and to the reference-numerals marked thereon.

My present invention relates to optics and more particularly to eyeglasses or spectacles and it has for its object to provide a simple, serviceable and comfortable construction of spectacle temple. The invention contemplates the use of different materials for the formation of the ear-piece and the lens attaching wire, respectively, and the improvements are directed more particularly to the means for rigidly connecting together in an efficient manner these necessarily small parts so that they will be sightly in appearance and may be adjusted to the spectacle frame without liability of breaking. To these and other ends the invention consists in certain improvements and combinations of parts all as will be hereinafter more fully described, the novel features being pointed out in the claims at the end of the specification.

In the drawings:

Figure 1 is a side elevation of a complete spectacle provided with a temple constructed in accordance with and illustrating one embodiment of my invention;

Fig. 2 is an enlarged, fragmentary, longitudinal section through the joint between the lens attaching wire and the ear-piece;

Fig. 3 is a similar view of the parts shown in Fig. 2 but with them detached to illustrate the manner of assembling, and Fig. 4 is a transverse section taken substantially on the line 4—4 of Fig. 2.

Similar reference numerals throughout the several figures indicate the same parts.

The primary object in providing the present form of temple, which object has led to this invention, is to add to the comfort of the wearer by giving an increased bearing surface to the ear-piece or ear engaging portion in its engagement behind the ear so that the skin will not be irritated or the flesh inflamed by the constant wear. To this end, the hooked ear-piece 1 of the usual curvature is made of one piece of material of comparatively large diameter, while the forward portion or lens attaching end may be of the relatively small wire form employed in the ordinary metal temple. This wire portion is indicated at 2, the lens attaching clip to which it is secured at 3, and the spectacle lens at 4.

The ear-piece 1 is preferably composed of celluloid or similar material; horn, shell and hard rubber being also adaptable to some degree, but I have found the commercial substance "xylonite," which is a form of celluloid largely used in the eyeglass art, to be the best material now known to me. The required characteristics are strength, toughness, elasticity and adaptibility to being easily formed and worked, together with lightness and that physical property common to the materials named and largely due to their non-conductivity to heat which makes them pleasing or unnoticeable to the touch and hence comfortable when in contact with the skin as distinguished from metals. When constructed of xylonite, these ear-pieces 1 may be heated slightly and formed up to the required hooked shape into which they will permanently set themselves. They are of solid construction but at their forward ends I bore or otherwise form central recesses 5 as shown in Fig. 3, the tip at the end of the recess being preferably reduced at 6 forming a shoulder 7.

The rear ends of the lens attaching wires 2 are provided at their extremities with enlarged fluted heads 8 composed of a plurality of laterally outstanding fins 9. In assembling the parts, the head 8 is forced into the recess 5 to the bottom thereof in which position it passes beyond the reduced portion 6. The recess 5 is prepared as of a diameter about equal to that of the body of the wire portion 2 so that the fins 9 on the head 8 force themselves into the material forming the walls of the recess, as shown in Fig. 4 and prevent the wire from subsequently turning in the ear-piece. Also the ends of the fins 9 are rounded or tapered as indicated at 10 in Fig. 3 so that they slide into position freely without danger of breaking the xylonite and when finally thrust home, the elasticity of the latter material causes it to, at least in a measure, flow back and refill the grooves from which it has been displaced by the fins so that the latter cannot be withdrawn. Furthermore, the tubular end of the ear-piece spreads a little as the wire is driven in and as a last operation, a small collar or ferrule 11 surrounding the wire 2 is forced tightly over the reduced portion 6 to abut the shoulder 7, as shown in Fig. 2 and this contracts the member 1 closely about the wire just in rear of the head 8.

The flexibility of the xylonite is, of course, much increased if it is pre-heated for the assembling operation, but I find in practice that this step is really not necessary as the head 8 is so firmly embedded against both longitudinal and rotating movements with the xylonite worked cold that the inset adjustments of the ear-pieces can even be made by twisting the wires 2 through the medium of the ear-pieces.

I claim as my invention:

1. The method of making temples for spectacles which consists in forming a longitudinal cavity in the end of an ear-piece composed of celluloid or similar material and then forcing endwise into such cavity a lens attaching wire of greater diameter so that the material of the ear-piece is expanded or displaced.

2. In a temple for spectacles, the combination with a solid ear-piece of comparatively large diameter composed of celluloid or similar material and having a recess in its forward end, of a relatively smaller lens attaching wire having its extremity anchored in the recess of the ear-piece by forcing it endwise therein, said extremity being provided with a laterally outstanding longitudinal fin while adjacent portions of the wire are approximately the size of the prepared recess.

3. In a temple for spectacles, the combination with a solid ear-piece of comparatively large diameter composed of celluloid or similar material and having a recess in its forward end, of a relatively smaller lens attaching wire having its extremity anchored in the recess of the ear-piece by forcing it endwise therein, said extremity being provided with a laterally outstanding longitudinal fin while adjacent portions of the wire are approximately the size of the prepared recess.

4. In a temple for spectacles, the combination with a solid ear-piece of comparatively large diameter composed of celluloid or similar material and having a recess in its forward end, of a relatively smaller lens attaching wire having a fluted head at its extremity anchored in the recess of the ear-piece by forcing it endwise therein, the recess being the same size as the body of the wire, and a ferrule surrounding the wire and clamped over the tip of the ear-piece, the said head being embedded in the material of the ear-piece beyond the ferrule.

WILLIAM E. McDONELL.

Witnesses:
RUSSELL B. GRIFFITH,
AGNES NESBITT BISSELL.